United States Patent [19]
Nebgen

[11] 3,877,218
[45] Apr. 15, 1975

[54] BRAYTON CYCLE SYSTEM WITH REFRIGERATED INTAKE AND CONDENSED WATER INJECTION

[76] Inventors: William H. Nebgen, 4824 43rd St., New York, N.Y. 11377

[22] Filed: Jan. 2, 1974

[21] Appl. No.: 429,557

Related U.S. Application Data

[60] Division of Ser. No. 180,282, Sept. 14, 1971, Pat. No. 3,788,066, which is a continuation-in-part of Ser. No. 34,717, May 5, 1970, Pat. No. 3,668,884.

[52] U.S. Cl. .............. 60/39.05; 60/39.55; 60/39.67
[51] Int. Cl. ............................................ F02b 43/12
[58] Field of Search ............. 60/39.05, 39.02, 39.67, 60/39.52, 39.55, 39.58, 39.54; 62/228

[56] References Cited
UNITED STATES PATENTS

| | | | |
|---|---|---|---|
| 2,362,714 | 11/1944 | Nettel | 60/39.67 |
| 2,441,751 | 5/1948 | Broggi | 60/39.55 |
| 2,678,532 | 5/1954 | Miller | 60/39.05 |
| 3,013,383 | 12/1961 | Malick | 60/39.05 |
| 3,621,656 | 11/1971 | Pacault et al. | 60/39.02 |

Primary Examiner—C. J. Husar
Assistant Examiner—Warren Olsen

[57] ABSTRACT

In an open Brayton cycle including a compressor, combustion chamber, and an expander, the suction air for the compressor is refrigerated to a temperature at which water vapor in the air condenses. This water is introduced into the compressed air from the Brayton cycle air compressor, vaporized in a recuperator by heat exchange with Brayton cycle expander exhaust before introducing the compressed air into the Brayton cycle combustion chamber. The condensation of the water is in the presence of an aqueous solution of a freezing point depressant or vapor pressure depressant so that the condensed water remains in liquid form.

5 Claims, 1 Drawing Figure

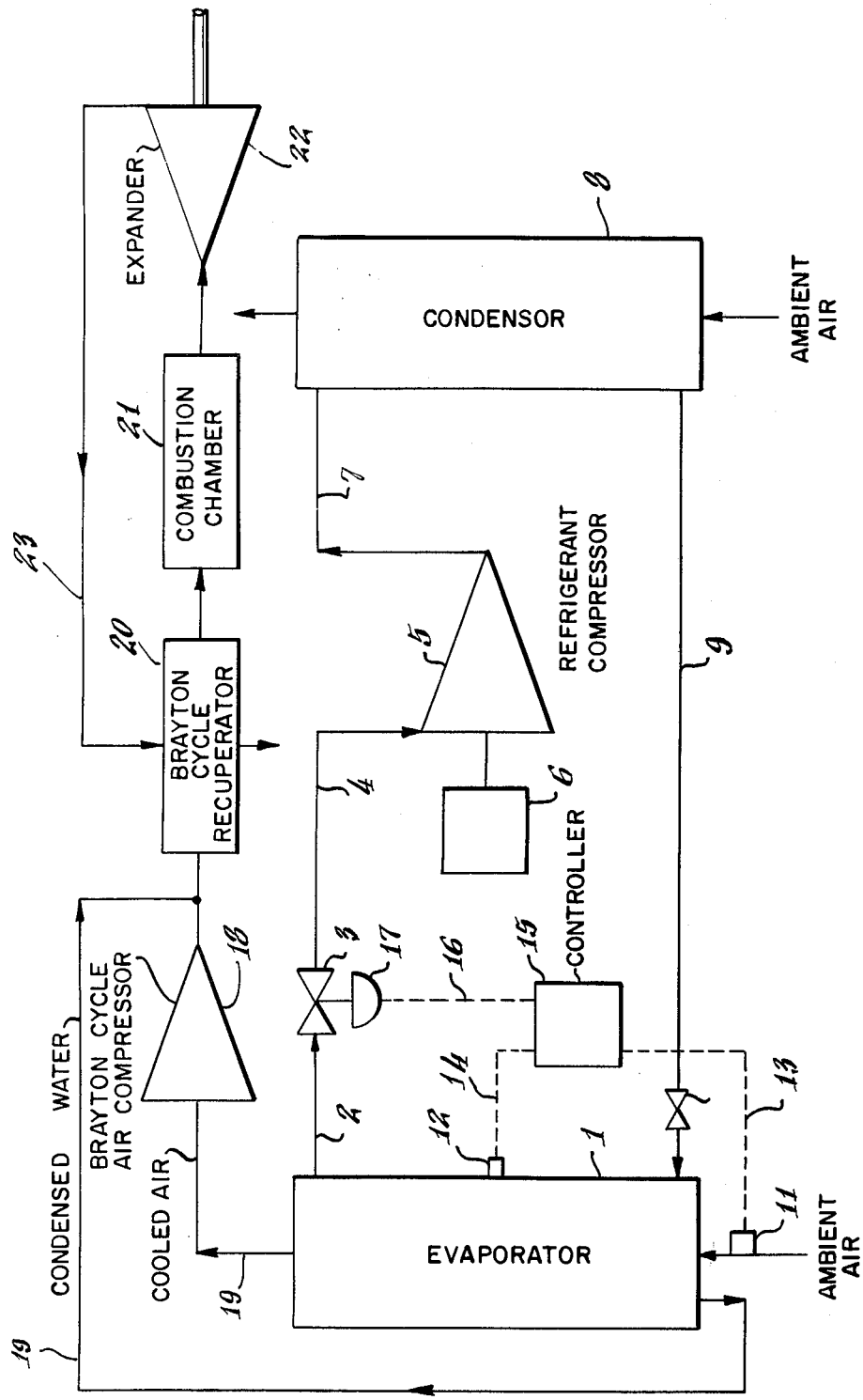

BRAYTON CYCLE SYSTEM WITH REFRIGERATED INTAKE AND CONDENSED WATER INJECTION

RELATED APPLICATIONS

The present application is a division of my co-pending application Ser. No. 180,282, filed Sept. 14, 1971 U.S. Pat. No. 3,788,066, which case in turn was a continuation-in-part of my co-pending applications, Ser. Nos. 34,717, filed May 5, 1970, U.S. Pat. No. 3,668,884.

BACKGROUND OF THE INVENTION

In a gas turbine the power output depends on the suction air temperature and increases as the temperature is lowered, other parameters remaining the same. This suction temperature is normally that of the ambient air and fluctuates daily, seasonally and with atmospheric conditions.

When the air entering the suction of a given engine is cooled by refrigeration the compression ratio and mass flow increase and the expansion ratio and mass flow also increase so that the net shaft output is increased accordingly. This increase in power output is considerably more than the power that is needed to effect the refrigeration. For the combined system of the Brayton cycle and refrigeration cycle the thermal efficiency is not significantly different from that of the Brayton cycle alone. The additional capital expense for refrigeration is often less than the value of the increase in power output that results from refrigerating the suction air.

In an open Brayton cycle engine, air enters the engine at atmospheric pressure, is compressed, is heated by being burned with fuel and then is expanded back to atmospheric pressure. The net work output of the engine is the relatively small difference between two quite large numbers, i.e., it is the difference in the total work produced by its expander and the work consumed by its air compressor. In this discussion, the open Brayton cycle expander for convenience is referred to as an "air" expander, although the working fluid actually contains the products of combustion of the fuel. The work produced by the air expander of a 5.4 ratio simple Brayton cycle engine is about 2.77 times the net work output of the engine, and when the compressor takes suction at ambient temperature (for example 100°F.) the work consumed by the air compressor is about 1.77 times the net work output. If the ambient temperature air is refrigerated before it enters the compressor, the work output of this Brayton cycle engine increases because the compression ratio increases, and the expansion ratio increases accordingly; the work produced by the air expander therefore increases; and also because the mass flow of air through the engine increases, due to the greater density of the cold air. The work which is required to refrigerate the inlet air must, of course, be deducted from the work which is produced by the Brayton cycle engine, but even when an inefficient single stage refrigeration system is used, the refrigerated suction engine delivers more usable shaft work than does the same engine if it takes suction at ambient temperature.

Similar advantages result from refrigerating the suction of a closed Brayton cycle engine, wherein the working fluid may be dry, and is heated indirectly in an external heat exchanger.

Refrigeration of suction air presents certain problems which arise from the condensation of moisture as the temperature of the air is reduced below the dew point. In the case of a large power facility the quantity of moisture is very large. For example, a typical facility to generate 200 megawatts, and receiving ambient air at 90°F. and 50 percent relative humidity, requires removal of 325,000 gallons daily of water when the dew point is reduced to 32°F.

Most of this is recoverable as liquid water by cooling the suction air to a temperature which is in the vicinity of the freezing point. Normally this requires refrigeration, for example, by indirect heat exchange with an evaporating refrigerant. Water condenses on the heat exchange surfaces and the runoff is collected and recovered. If the air were to be cooled by refrigeration substantially below the freezing point the vapor would condense to produce ice, or rime, on the cooling surface. This accumulation in a short time would block the passages for air flow in indirect heat transfer apparatus for air cooling.

In the prior art of cooling air, for example the refrigerated storage of food, icing is prevented or reduced by applying to the heat exchange surface a liquid which lowers the freezing point. It is to be noted, however, that in this method of the prior art the quantities of water to be removed from the air are minor in comparison with the very large quantities which are contemplated for the refrigeration of the suction air to a Brayton cycle when the air is at ambient temperature and humidity.

SUMMARY OF THE INVENTION

In the present invention not only is overall efficiency of the system increased, as set out above, because the power for refrigeration is less than the saving in compressor power over compressing air at ambient temperature but water which is condensed from the air which is refrigerated is then introduced into the Brayton cycle between the compressor and the combustion chamber and preferably between the compressor and a recuperator, in which the air is heated up by heat exchange with Brayton cycle expander or turbine exhaust gases. This results in vaporizing the injected water, which increases the volume of working fluid in the Brayton cycle expander. At the same time, the absorption of heat in vaporizing the water reduces the temperature of the combustion gases from the combustion chamber, which helps in bringing them down to a temperature which the expander can safely endure. Otherwise this would require a larger dilution with excess air and hence more compressor power requirements.

In more specific aspects the cooling and dehumidification of the suction air in an open Brayton cycle is effected by an improved method. In one embodiment of this method the suction air is caused to pass over a heat transfer surface which is preferably wetted by an aqueous solution, e.g. of ethylene glycol, methanol, etc. The composition of the aqueous solution which is applied to the surface is controlled to avoid solidification on the heat transfer surface at the temperature of the refrigerant or cold fluid.

It is, of course, clear that the aqueous solution absorbs the water vapor from the suction air and becomes diluted thereby. In accordance with this invention the composition and quantity of the solution applied to the heat transfer surface is controlled, in combination with the quantity of water condensed, so that the composition of the solution when it is diluted with condensate is everywhere on the heat transfer surface a composition corresponding to a freezing point which is sufficiently below the temperature of the refrigerant or coolant to prevent ice deposition.

Usually it is advantageous to cool the air in stages to the desired suction temperature. The minimum concentration of the aqueous solution in contact with the heat transfer surface in the lower temperature stages is therefore required to be greater than that of the higher temperature stages in accordance with their respective freezing points. Accordingly, it is preferable to utilize the spent solution from the lower temperature stages of cooling as the solution to be applied to the higher temperature stages, although this is not mandatory and the invention is, therefore, not limited thereto.

Ultimately the final spent solution is regenerated by a distillation separation obtaining a more concentrated aqueous solution to be recycled for application on the heat transfer surface. When, as for example in the case of a glycol, the aqueous solute is less volatile than water the latter is removed in the overhead vapor of the distillation whereas, for example in the case of methanol, the solute, being the more volatile component, is recovered in the overhead fraction, leaving the water in the bottoms. From this overhead vapor the methanol is condensed and recycled.

The choice of an aqueous solute in accordance with this invention depends on the temperature range of the air cooling stage. Ethylene glycol is a preferred solute, at temperatures above about $-40°F$. Below this temperature the viscosity of the aqueous solutions of glycol is high. At lower temperatures methanol provides the desired freezing point depression without excessive viscosity or too high vapor pressure whereas at higher temperatures methanol is too volatile.

In a second embodiment of this invention there is direct transfer of heat from the air to the aqueous solution at each stage of cooling, together with indirect heat transfer from the aqueous solution to a refrigerant or coolant. The aqueous solution is recycled between these two heat exchange operations and it serves thereby as a medium for heat exchange as well as for absorption of condensed water vapor from the air. The concentration of the aqueous solution in each cooling stage is controlled by the withdrawal of dilute solution and the return of a more concentrated solution to replace the dilute solution which is withdrawn. The difference in the water content of the dilute solution and the concentrated solution represents the water vapor that has been condensed from the air.

In this embodiment, as in the first embodiment, the composition of the aqueous solution is controlled so that at the temperature of the refrigerant or coolant, freezing does not occur on the heat transfer surface which in this embodiment separates the refrigerant, or coolant, and the aqueous solution.

Contact between the aqueous solution and the suction air is by means of a packed bed or other apparatus and the scope of the invention is not limited to any particular form of apparatus. The transfer from the aqueous solution to the refrigerant or coolant is preferably in a shell and tube heat exchanger but again the invention is not limited thereto.

At any stage of air cooling which is above the normal freezing point of water there is no need for an aqueous solution to control the freezing on the heat transfer surface in either embodiment of this invention and water could be recirculated in the second embodiment. However, the aqueous solution in either embodiment dehumidifies as well as cools the air. For this reason it is advantageous to utilize an aqueous solution even in the higher temperature stages of cooling above 32°F. since this tends to remove, at a given temperature, a larger amount of water vapor from the air, and thus reduces the work of refrigeration. Another advantage of using an aqueous solution of a freezing point depressant even where cooling would not result in ice deposition is that it is not necessary to change the composition of the recirculated coolant as temperatures change and this simplifies equipment and operation.

While a freezing point depressant is preferred, the present invention in its broader aspects is not absolutely limited to such a material for the prevention of formation of solid ice on heat exchange surfaces. It is possible to use a material which is relatively immiscible with water, for example, a liquid hydrocarbon. In this case the freezing point of condensed water is not actually depressed but the flow of the substantially non-solvent liquid keeps ice crystals very small and in effect keeps them in a dispersed form so that they do not deposit as solids on the refrigerating equipment. Separation of water from a non-solvent can be effected simply and economically by raising the temperature above the freezing point of water, forming liquid water, which can be separated by decantation or other conventional methods of separating water from non-solvent liquids. It will be noted that regardless of how ice formation is controlled, relatively pure water is produced.

Utilization of condensate water in an open Brayton cycle for improvement of thermal efficiency and of power output capacity has been described. One method to use this condensed water is to spray it into the air compressor of the Brayton cycle and another method of utilization is to inject the steam resulting from the vaporization of the condensate into the stream of air from the Brayton cycle compressor. It should be noted that increase of thermal efficiency and power output capacity do not necessarily involve the same economic considerations. Thermal efficiency increases are largely factors which lower fuel cost. However, for certain uses, such as Brayton cycle installations for power peaking in electric generating plants, increases in power output may be more valuable than savings in fuel cost. As has been pointed out above, and will appear below, not all of the features of the present invention increase both thermal efficiency and power output capacity. In the case of the use of condensate water, there is the fortunate situation that both factors are improved. It should be noted that the present invention in the aspect just set out need not be limited to using all of the condensed water in the Brayton cycle and that the invention, therefore, does include combinations of features in which only part of the condensate water is used in the Brayton cycle. However, as the amount of condensate water is normally less than that which can be effectively used in the open Brayton cycle, it is usually preferable to use all of the condensate water.

If the water is utilized as steam to increase the volume of gas to the expander, the steam must be generated at a pressure equal to, or slightly higher than, the Brayton cycle compressor discharge and it should be admitted at, or prior to, the combustor. The heat that is needed to generate the steam preferably is obtained by waste heat recovery from the stack gases. Condensate which is obtained as liquid water, either from condensation above the temperature of ice formation, or by recovery from an aqueous solution of a solute which has volatility differing from that of water, is evaporated under a pressure which is at least as high as that of the Brayton cycle compressor discharge. When the condensate water is in the form of a solution of glycol or other solute which is less volatile than water the water is distilled at the pressure required for injection and the vapor is rectified to the extent necessary to minimize the loss of solute. The rectified water vapor represents the steam which is then suitable for injection, the distillation and rectification heat preferably being obtained from the Brayton cycle exhaust, though other sources of waste heat may be used.

This invention is not limited to any particular refrigeration system, but a multistage refrigeration system in many cases is preferable since it is more efficient than a single stage system because all of the heat withdrawal is not at the lowest temperature.

Still another aspect of this invention relates to the improvement which results from the combination of refrigeration of suction air with recuperation of the waste heat from the turbine exhaust in a regenerator. Recuperation or regeneration to improve the energy efficiency of a simple Brayton cycle by utilizing some of the waste heat to reduce the amount of fuel required to raise the gases to the turbine inlet temperature is not unknown, and it is an advantage of the present invention that recuperation can be used, and used even more effectively, than in the prior art.

The quantity of heat recuperated is limited by the temperature difference between the turbine exhaust and the compressed air which absorbs the heat. When as in accordance with this invention, the suction temperature is reduced by refrigeration of the air, the temperature of the compressed air is lowered. This increases the capacity of the compressed air to absorb waste heat from the exhaust gases. There is an energy saving of one Btu for every Btu of transfer in the regenerator. Consequently the combination of heat regeneration and refrigeration to reduce the compressor suction temperature is an important advantage of this invention.

In the parent application, Ser. No. 180,282, referred to above, there is described and claimed the use of ambient air as a heat sink for the refrigeration system and maintaining a constant temperature differential between the refrigerant at evaporation and condensation. This feature, while not claimed apart from the features of the claims of the present application, condensation water injection into the Brayton cycle system, prevention of icing up of refrigerant condenser, etc., is usable in addition to the principal features of the present invention and is briefly described as follows.

The vapor pressure in the condenser varies with the temperature of the coolant air, and this represents a corresponding variation of the discharge pressure of the refrigeration compressors. Since it is desirable that the suction air temperature be a fixed amount below the ambient air temperature, the pressure in the evaporator also varies, the pressure being higher with a higher ambient air temperature. The refrigerant compressor is a constant volume device, but the density of the refrigerant vapor varies inversely with its pressure so that, without suitable control, the mass flow of refrigerant is similarly variable. As a consequence, the compressor of a system which is designed to cool the suction air by, say, 50°F., at an ambient temperature of 95°F., will not have the capacity to cool the air by the same amount when the ambient temperature is 40°F. Accordingly, in the system of this invention, I provide a means for throttling the vapor from the evaporator so that at the higher temperatures the flow of vapor is reduced, while at lower ambient temperatures it is increased to compensate for the inverse tendency which is a consequence of the changes of vapor density.

One method of throttle control is by adjustable guide vanes in the inlet to the compressor. The angle of the vanes and the space between them is adjusted manually or automatically to control the flow of the refrigerant vapor and, thereby, the rate of evaporation, so that there is maintained a substantially constant difference between the temperature of the Brayton cycle suction air and that of the ambient air. The signal output of two temperature sensors, one in the ambient air and the other in the compressor suction, can be used to operate a servo system which positions the inlet guide vanes.

In a multistage system of refrigeration in which the mass flow of refrigerant in each compression stage is dependent on the other stages, the preferred embodiment is one which provides throttle control at each stage. For example, when the range of ambient variation is 50°F., at the maximum ambient temperature the compressor should be throttled to about one-third of its capacity and should be wide open at the lowest ambient temperature.

When it is desired to refrigerate the suction air to temperatures as low as −40°F. or less it becomes difficult to find non-volatile substances which, in aqueous solution, are sufficiently fluid at these low temperatures. Accordingly, it is an object of this invention to remove moisture from the air by means of an aqueous solution at the next higher temperature stage of refrigeration so that the air which enters the lowest temperature stage of refrigeration has a dew point which is so low that the final stage may be by means of a heat transfer surface which remains "dry," i.e., free of ice condensation without the application of an aqueous solution.

This is achieved by control of the concentration and temperature of the aqueous solution in contact with the air in the next to final stage of refrigeration, in combination with the final stage temperature. The advantage gained from this method of staging of the air cooling is that the aqueous solution does not have to be used at the lowest temperature of the air, at which the solution viscosity may be excessively high. For example, a 60 percent glycol solution is used at −32°F. to cool, and remove moisture from, air which may then be further cooled "dry" to −45°F. At −32°F. the viscosity of the aqueous solution of glycol is 100 centipoises, which is not too heavy for process use, whereas at the lower temperature of −45°F. the viscosity is 500 centipoises, which is excessive. The control of these temperatures in combination with the aqueous solution composition thus enables the cooling of the air to a temperature which is not otherwise practical.

Most of the preceding discussion has been directed particularly to a refrigerated suction regenerated open Brayton cycle engine. Very similar improvements in output and efficiency result when refrigeration and regeneration are applied to a closed Brayton cycle engine, in which the cooling fluid, which may be a dry gas such as helium, argon, etc., is heated indirectly in an external heat exchanger. Such a closed Brayton cycle is sometimes used with atomic power generators.

Because of the greater flexibility in plant arrangement, significant economic advantage is obtained when an auxiliary fluid, such as "Dowtherm," is used to transfer regenerated heat from the expander exhaust to the compressor discharge.

BRIEF DESCRIPTION OF THE DRAWING

The drawing is a diagrammatic illustration of an open Brayton cycle condensing water from cooling of air to the Brayton cycle compressor and injecting this water into the Brayton cycle system.

DESCRIPTION OF THE PREFERRED EMBODIMENT

The drawing illustrates diagrammatically a simple, conventional refrigerating system with refrigerant evaporation and condensation, the latter being by heat exchange with ambient air. Ambient air passes through a refrigerant evaporator 1 where it is cooled to a predetermined temperature, such as at least 50°F. below the temperature of the ambient air, in the presence of a freezing point or vapor pressure depressant in the form of an aqueous solution when a predetermined temperature is sufficiently low to present the possibility of water from the ambient air condensing out and freezing. Water condensed out is passed through a conduit to a point in the Brayton cycle system between air compression and turbo expansion. This will be described in more detail below. The air passing through the evaporator 1, and cooled therein, is shown leaving through a conduit at the top of the evaporator. As indicated, this cool air goes to the inlet of a Brayton cycle air compressor, which is shown diagrammatically as the compressor is a conventional piece of apparatus and the exact mechanical construction of a particular compressor forms no part of the present invention, which includes the use of any well known Brayton cycle air compressor or compressor system.

The refrigerant vapors leave through conduit 2, passing through a throttling valve 3 and thence through the conduit 4 to a refrigerant compressor 5 driven by a motor 6. The compressed refrigerant vapors pass through conduit 7 into the top of a condenser 8 where they are cooled by heat exchange by ambient air as indicated. This results in condensation of the refrigerant vapors to liquid refrigerant which passes through pipe 9 and expansion valve 10 into the refrigerant evaporator 1.

There are two temperature sensors, one 11 for the ambient air entering the evaporator 1 and the temperature therein, which is sensed by another sensor 12. These sensors connect to inputs 13 and 14, which may be wires, to a controller 15 which converts them to a differential signal 16 which operates a servo mechanism 17 driving the throttling valve 3. The controller 15, of conventional design, is set for the predetermined temperature between sensors 11 and 12 which sense the temperature of refrigerant condensation and evaporation respectively. The temperature of the ambient air is, of course, substantially that of the condensed refrigerant in a condenser 8. As is common in differential controllers, controller 15 will put out a signal 16 only when the differential between the temperature sensed by sensor 11 and sensor 12 depart from the predetermined value for which the controller 15 is set. As is customary in such control circuits, the signal 16 is in a different phase depending on whether the temperature differential between sensors 11 and 12 is greater or less than the predetermined value set in the controller. This signal operates the servo mechanism 17 to vary the setting of the valve 3 and hence the throttling of the refrigerant vapor. As soon as the throttling has brought the temperature differential between sensor 11 and 12 to the predetermined value, the signal 16 ceases and the throttling therefore maintains the predetermined temperature differential regardless of the temperature of the incoming ambient air.

The invention is, of course, not limited to any particular special design of throttling mechanism.

In the drawing the cooling of the air is effected, as described above, in a refrigerant system involving an evaporator and condenser. The Brayton cycle system, which is shown purely diagrammatically, includes a compressor 18, a recuperator 20, a combustion chamber 21, and an expander or turbine 22. For clarity these elements of the system also carry legends, as do the conduits for cooled air and condensed water, which will be described. The expander shaft is shown broken away as the nature of the element driven thereby is not changed by the present invention. For example, a generator, (not shown), can be driven from the expander 22.

Cooled air from the evaporator 1 passes through a conduit 19 to the Brayton cycle air compressor 18. Condensed water from the evaporator 1 passes through the conduit 19 to a point between the air compressor 18 and the Brayton cycle recuperator 20. The nature of the introduction is not the feature of the present invention and the showing is therefore purely diagrammatic. In the recuperator 20, which receives expander exhaust gases through the line 23, heats up the compressed air, and assures that the condensed water from the line 19 is transformed into steam. The air and steam then pass to the combustion chamber 21 where they are burned with the conventional fuel from a source not shown. The hot combustion gases, at a temperature which the expander turbine blades can endure, then pass into the expander, where they are expanded and generate power. As in all open cycle Brayton systems such as the one illustrated in the drawing, it is necessary to cool down the gases leaving the combustion chamber 21 to a temperature which the expander can tolerate. In conventional Brayton cycle systems this is effected by a sufficient excess of compressed air. In the present system, as has been mentioned in the summary of the invention, the injected condensed water produces additional cooling so that the excess of compressed air can be somewhat reduced.

I claim:

1. In a simple open cycle Brayton system including an air compressor, a combustion chamber and an expander, the improvement which includes, in combination, refrigerating the suction air to the compressor to a temperature at which water vapor in the air condenses, vaporizing the condensed water by introducing it into a portion of the Brayton cycle system between air compressor and combustion chamber, whereby efficiency of the system is increased and excess of air to the combustion chamber is reduced.

2. A Brayton cycle according to claim 1 in which the water is condensed in the presence of an aqueous solution of a freezing point depressant.

3. A Brayton cycle system according to claim 1 in which the water is condensed in the presence of a water vapor pressure depressant.

4. A Brayton cycle system according to claim 2 in which the composition of the aqueous solution is controlled to avoid the freezing of the solution at the temperature of the refrigerated air.

5. A Brayton cycle system according to claim 2 in which the aqueous solution absorbs water from the air being refrigerated while flowing in a film over a heat conducting wall which separates the solution from the refrigerant or coolant.

* * * * *